(12) United States Patent
Murjahn et al.

(10) Patent No.: US 6,352,581 B1
(45) Date of Patent: Mar. 5, 2002

(54) COATING AGENT FOR REDUCING THE SOILING PROCESS OF FACADES

(75) Inventors: Klaus Murjahn, Darmstadt; Hermann Ackermann, Ober-Ramstadt; Ingo Rademacher, Dieburg, all of (DE)

(73) Assignee: Clariant GmbH, Frankfurt (DE)

( * ) Notice: Subject to any disclaimer, the term of this patent is extended or adjusted under 35 U.S.C. 154(b) by 0 days.

(21) Appl. No.: 09/446,742
(22) PCT Filed: Jun. 25, 1998
(86) PCT No.: PCT/EP98/03879
 § 371 Date: Dec. 27, 1999
 § 102(e) Date: Dec. 27, 1999
(87) PCT Pub. No.: WO99/00457
 PCT Pub. Date: Jan. 7, 1999

(30) Foreign Application Priority Data

Jun. 25, 1997 (DE) .......................................... 197 26 814

(51) Int. Cl.⁷ ................................................. C09K 3/00
(52) U.S. Cl. ...................... 106/2; 106/266; 106/287.34; 501/154

(58) Field of Search ...................... 106/2, 26.6, 287.34; 501/154

(56) References Cited

U.S. PATENT DOCUMENTS

| | | | |
|---|---|---|---|
| 2,877,142 A | | 3/1959 | Rusber et al. |
| 3,654,176 A | * | 4/1972 | Neumann et al. ....... 252/313 R |
| 5,423,911 A | * | 6/1995 | Coutelle et al. ............ 106/416 |

OTHER PUBLICATIONS

Translation of Japanese reference 6–336559 (Dec. 1994).
"The role of Laponite as a additive in waterborne applications", Polymers Paint Colour Journal, Doyle et al, 1997. No Month Avail.*

* cited by examiner

*Primary Examiner*—David Brunsman
(74) *Attorney, Agent, or Firm*—Anthony A. Bisulca

(57) ABSTRACT

The present invention relates to a transparent coating agent that comprises a layered silicate capable of forming a colloidal gel in the presence of water. This invention also relates to the preparation of this agent and to its use for reducing the soiling process of facades.

11 Claims, No Drawings

COATING AGENT FOR REDUCING THE SOILING PROCESS OF FACADES

This is a 371 filing of PCT/EP98/03879 filed Jun. 25, 1998.

The present invention relates to a transparent coating composition based on a sheet silicate, to its preparation and to its use for reducing the soiling tendency of facades.

Facades, like any other surface, become soiled over time owing to deposits from the air onto the surface. This soiling is manifested in graying. Using light microscopy and SEM investigations on facade coatings which have been weathered under open-air conditions it has been found that the soiling consists essentially of inorganic particles with a size of up to 10 μm along with small fractions of soot.

U.S. Pat. No. 2,877,142 discloses the dirt repelling action of inorganic sols, such as silica sols, on surfaces. The use of silica sols on facades is hindered by their low viscosity. In the DIN 4 mm flow cup, these sols have a viscosity of 14.3 s (23° C.). Application techniques used are brushing, rolling and spraying. When applied at a rate appropriate to that in practice of about 50–250 g/m², preferably 50–150 g/m², the silica sols run on vertical faces such as facades. It is therefore impossible to obtain the even coat thickness that is required for the coating to have a uniform dirt repelling effect. At application rates of from 50 g/m² to 250 g/m², splashes and water runs occur which prevent an even coating. A thixotropic or at least pseudoplastic consistency, which permits brushing tools to be used without problems, is not possible with sols. Such a consistency is obtained if in the DIN 4 mm flow cup efflux times of more than 100 s at least are measured.

The object of the present invention, then, is to provide a transparent, readily processable, color-neutral and at least pseudoplastic coating composition which permits an even application to facades and at the same time reduces their soiling tendency and the attenuation of gloss.

It has been found that only a few selected materials are compatible with this object for the coating composition of the invention. The choice of a suitable rheological material has a critical influence on the effect of the coating material. For instance, organic gel formers such as cellulose ethers, polyacrylates and polyurethane thickeners remove the activity of the silica sols in reducing soiling. In the case of inorganic gel formers, the soiling-reducing effect of the silica sols is not removed. For instance, with coating compositions based on silica sol and synthetic or natural sheet silicates a marked reduction was found in the soiling tendency. However, natural inorganic sheet silicates are unsuited to the set object owing to the lack of color neutrality of the coating composition. The observed yellowishness of the coating composition did not permit color-neutral drying. The yellowishness originates from the iron inclusions in the sheet silicates. Sheet silicates from all known deposit regions have iron inclusions. In addition, the natural sheet silicates are not completely transparent. The average particle sizes of the known natural sheet silicates are within the micrometer range. Pyrogenic silicas are likewise inorganic compounds, but cannot be processed with silica sol and water to give a homogeneous coating composition and so do not meet the set object. Precipitated silicas, again, are inorganic compounds, but have average particle sizes of more than one micrometer. Consequently, the coating composition prepared from them using silica sol and water does not dry to a transparent film.

It has surprisingly been found that synthetic inorganic sheet silicates which give a transparent gelatinous paste with water possess both per se and in combination with silica sols, a dirt repelling action and also comply with the other conditions of the set object. They are therefore suitable as coating compositions for the stated set object. The viscosity in this case is preferably established so that an even application of from 50 g/m² to 250 g/m² is possible. The consistency is raised to such an extent that in the DIN 4 mm flow cup efflux times of more than 100 s at least are measured. It proves even more favorable if the medium can no longer be found to have any fluidity. The resulting coating material shows thixotropic properties. Application to substrates can now be made, even using brushing tools, without splashes or runs. The resulting coating is transparent and does not show any color changes of the substrate.

The invention accordingly provides a coating composition comprising at least one sheet silicate which forms a colloidal gel in water. The coating composition is transparent and the sheet silicate used is preferably a nanoscale silicate having an average particle size of from 5 to 800 nm, preferably from 25 to 500 nm, in particular from 100 to 400 nm.

Sheet silicates suitable in accordance with the invention are available commercially; suitable examples include SKS—20/Saponite (Hoechst AG, Frankfurt, Germany), SKS—21/Hectorite (Hoechst AG; Frankfurt, Germany), Optigel® SH (Sud Chemie AG, Munich, Germany) and Laponite® RD (Deutsche Solvay Werke GmbH, Solingen, Germany). Mixtures of these sheet silicates with one another are also suitable. All of these colloidal gels, which have been prepared from water with synthetic inorganic sheet silicates, preferably having a particle size of below 1 micrometer, meet the object of the invention. The transparent coating composition also features the desired properties when other, at least colloidally soluble inorganic substances (for example, silica sols) are present.

In the text below, the invention is illustrated with reference to examples.

Various coating compositions were prepared and their action was tested on the substrate and in the soiling test. The coating compositions contained different gel-forming substances along with silica sols and water. The preparation and testing are described in detail.

EXAMPLE 1

Composition: 6.7 g of Klebosol 30 N 12 (Société Francaise Hoechst/silica sol)

91.3 g of water 2.0 g of Laponite RD 38 g of water were introduced initially. The Laponite was added with stirring on a dissolver at 2700 rpm. After 10 minutes of stirring, the base gel was prepared. This mass was aged at 23° C. and 50% relative atmospheric humidity for 16 h. Then 53.3 g of water and the silica sol were added. Finally, the mass was stirred on a dissolver for 5 minutes.

The colloidal gel, with about 50 percent by weight of synthetic resin dispersion as binder component, was then coated onto a polymer dispersion facade paint. The application was made with brushing tools, with no splashes or runs. The result was a transparent, imperceptible, even coat. The application rate was 60 g/m².

In parallel, the coating composition was applied to a synthetic resin dispersion render which had been dried for 24 hours. The composition was applied using the same tools. An even coat without water runs was obtained. The application rate was 150 g/m².

EXAMPLE 2

Composition: 95.0 g of water 5.0 g of Laponite RD

The water was introduced initially. The Laponite was added with stirring on a dissolver at 2700 rpm. After 10 minutes of stirring, the base gel was prepared. The coating composition was finally aged at 23° C. and 50% relative atmospheric humidity for 16 h.

The colloidal gel, with about 50 percent by weight of synthetic resin dispersion as binder component, was then coated onto a polymer dispersion facade paint. The application was made with brushing tools, with no splashes or runs. The result was a transparent, imperceptible, even coat. The application rate was 70 g/m$^2$.

In parallel, the soiling tendency of the coating composition was tested. For this purpose, a synthetic resin emulsion paint with about 50 percent by weight of synthetic resin dispersion as binder component was knife-coated onto the surfaces of Leneta sheets. The application rate was 250 g/m$^2$. The sheets were stored under standard climatic conditions (23° C./50% relative atmospheric humidity) for 48 hours and finally at 40° C. for 24 hours. The coating composition was subsequently applied to these samples using a paintbrush. The application rate was 100 g/m$^2$. The coatings were then dried at room temperature. Subsequently, the sample was covered with dust. The model substance used was fly ash. The dust not adhering to the sample was removed using compressed air. As a reference for the test, the surface of a synthetic resin emulsion paint was used. Both samples were tested visually. The coating composition exhibits a distinct reduction in the amount of dirt adhering to the synthetic resin dispersion surface.

EXAMPLE 3

Composition: 6.7 g of Klebosol 30 N 12 (Société Francaise Hoechst/silica sol)

91.3 g of water 2.0 g of gel former (see example)

38 g of water were initially introduced. The gel former was added with stirring on a dissolver at 2700 rpm. After 10 minutes of stirring the base gel was prepared. This mass was aged at 23° C. and 50% relative atmospheric humidity for 16 h.

Then 53.3 g of water and the silica sol were added. Finally, the mass was stirred by a dissolver for 5 minutes. Gel formers used were the following substances:

From the class of precipitated silicas:

Kieselsäure 320 DS (Degussa, Hanau, Germany);

Syloid® ED 3 (Grace, N.Y., USA)

From the class of natural sheet silicates:

Bentone® CT (Rheox); Bentone LT (Rheox);

From the class of pyrogenic silicas:

Aerosil® LR 972 (Degussa);

From the class of synthetic sheet silicates:

Laponite RD (Deutsche Solvay GmbH); Optigel SH (Süd Chemie);

SKS-20/Saponite (Hoechst); SKS-21/hectorite (Hoechst);

From the class of polyacrylates:

Latecoll® D (BASF, Ludwigshafen, Germany);

Rohagit® SD 15 (Roehm); Carbopol® (Goodrich);

From the class of cellulose ethers:

Walocel® XM 30,000 PV (Wolff-Walsrode, Walsrode, Germany);

Tylose® MG 30,000 YG 8 (Hoechst);

From the class of polyurethane thickeners:

Coatex® BR 125 (Coatex); Acrylsol® RM 8 (Rohm & Haas); Coatex AC 668 (Coatex); Coapur® 5035 (Coatex); Rheolate® 278 (Rhoex).

During the preparation of the coating composition, the incorporation was assessed. The Aerosil LR 972 could not be stirred in. Bentone CT and Bentone LT gave a yellowish tinge to the coating composition, so that it was not possible for color-neutral and transparent coatings to be formed.

The assessment of the transparency and of the color neutrality was made on a green synthetic resin emulsion paint with about 50 percent by weight of synthetic resin dispersion as binder component. The paint was coated onto a fiber cement slab, stored in the laboratory for 3 days and then coated with the coating composition. After the drying of the coating at room temperature, the appearance of the surface was compared with a standard. In this case it was found that Kieselsäure 320 DS and Syloid ED 3 lacked transparency and color neutrality. With the gel formers Coatex BR 125, Rheolate 278, Coatex BR 100, Acrylsol RM 8, Coatex AC 668 and Coapur 5035, the slabs were found to have a mottled appearance in comparison with the standard following watering and subsequent drying. The polyacrylates Latecoll D; Rohagit SD 15 and Carbopol also showed this phenomenon.

In order to test the soiling tendency of the coating compositions, a synthetic resin emulsion paint with about 50 percent by weight of synthetic resin dispersion as binder component was knife-coated onto the surface of the Leneta sheets. The application rate was 250 g/m$^2$. The sheets were stored under standard climatic conditions (23° C./50% relative atmospheric humidity) for 48 hours and finally at 40° C. for 24 hours. The coating composition was then applied to these samples using a paintbrush. The application rate was 100 g/m$^2$. The coatings were subsequently dried at room temperature. Then, one sample of each coating composition was watered for 15 hours. This sample and a further, unwatered sample of the coating composition were wetted and then soiled. The model soiling substance used was fly ash. The graying was subsequently quantified. This was done by determining the brightness values in accordance with DIN 53778 using a color difference measuring apparatus. The difference between the brightness values of the soiled samples and unsoiled reference samples gave the measure of the soiling tendency. In comparison to the uncoated soiled synthetic resin emulsion paint, a reduction in the soil uptake was found in the case of Laponite RD; SKS-20/Saponite, and SKS-21/hectorite. No reduction in the soiling tendency was found with the use of gel formers such as Tylose MW 30,000 YG 8 and Rohagit SD 15. An increase in the soiling tendency relative to the uncoated synthetic resin emulsion paint was found with Latecoll D, Walocel XM 30,000 PV and Coatex BR 100.

The attached table summarizes the results by gel former type.

| | Properties of the transparent coating compositions as a function of the gel former | | | | |
|---|---|---|---|---|---|
| Product Type | Transparency | Processing | Color neutrality | Soil adhesion | Gloss attenuation |
| Precipitated silicas | no | good | no | — | yes |
| Natural sheet silicates | no | good | yellowish | no | no |
| Polyacrylates | mottled | good | no | yes | no |

-continued

Properties of the transparent coating compositions as a function of the gel former

| Product Type | Transparency | Processing | Color neutrality | Soil adhesion | Gloss attenuation |
|---|---|---|---|---|---|
| Cellulose ethers | — | good | — | yes | — |
| Pyrogenic silica | — | poor | — | — | — |
| Polyurethane thickener | mottled | good | mottled | yes | — |
| Synthetic sheet silicate | yes | good | yes | no | no |

What is claimed is:

1. A transparent coating composition comprising at least one synthetic sheet silicate and at least one silica sol which form a colloidal gel with water.

2. The coating composition as claimed in claim 1, wherein the sheet silicate is a nanoscale sheet silicate.

3. The coating composition as claimed in claim 1, wherein the sheet silicate has an average particle size of 5 to 800 nm.

4. The coating composition as claimed in claim 1, which in the DIN 4 mm flow cup has an efflux time of at least 100 s.

5. The coating composition as claimed in claim 1, which possesses no fluidity.

6. The coating composition as claimed in claim 1, which is thixotropic.

7. The coating composition as claimed in claim 1, which comprises no organic gel formers.

8. A process for preparing a transparent coating composition comprising the steps of: adding water to a synthetic sheet silicate and a silica sol which form a colloidal gel with water and processing the mixture to a gel.

9. A coating formulation for the purpose of dirt repellence comprising a transparent coating composition including at least one synthetic sheet silicate and at least one silica sol which form a colloidal gel with water.

10. A dirt repelling coating comprising at least one synthetic sheet silicate and at least one silica sol which form a colloidal gel with water.

11. A coating formulation comprising a pigment, a synthetic sheet silicate, and a silica sol which form a colloidal gel with water.

* * * * *